UNITED STATES PATENT OFFICE.

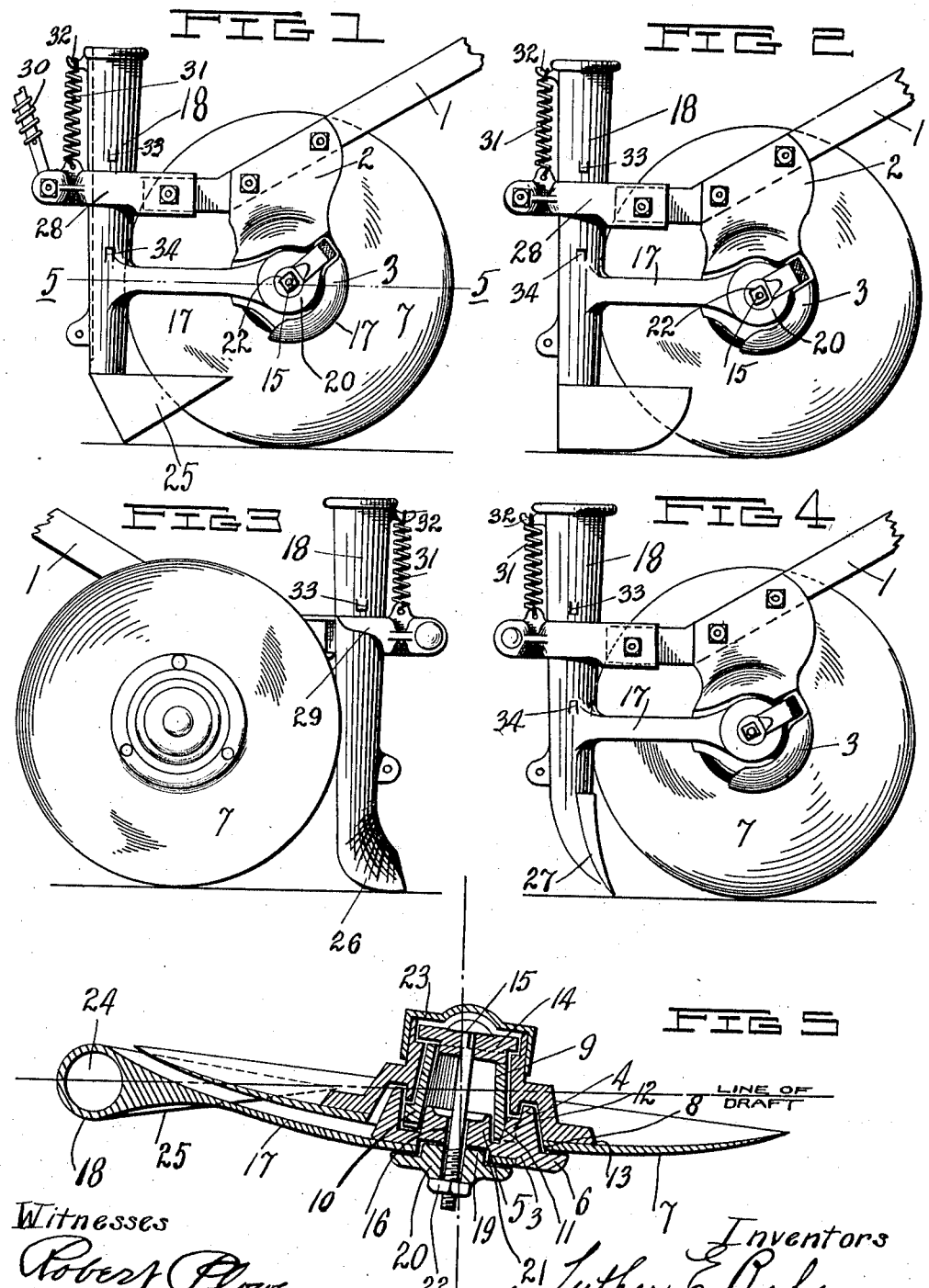

LUTHER E. ROBY AND CLARENCE A. PATTISON, OF PEORIA, ILLINOIS.

GRAIN-DRILL.

1,041,166.   Specification of Letters Patent.   Patented Oct. 15, 1912.

Application filed January 5, 1910. Serial No. 536,531.

*To all whom it may concern:*

Be it known that we, LUTHER E. ROBY and CLARENCE A. PATTISON, citizens of the United States, residing at Peoria, in the county of Peoria and State of Illinois, have invented certain new and useful Improvements in Grain-Drills; and we do hereby declare that the following is a full, clear, and exact description of the invention, which will enable others skilled in the art to which it appertains to make and use the same.

This invention has reference to grain drills and particularly to a type which we have designated a disk-shoe-drill being that type of drill, having a disk which cuts the way for a shoe, runner, divider, cutter or hoe-point attached to or forming a part of a seed conducting tube or shank, said shoe, runner, divider, cutter or hoe-point follows behind the disk and cuts or divides the earth spreading and holding it open in the form of a furrow, into which the seed or grain drops through the conducting tube or shank.

One of the objects of the present invention is the means or instrumentality employed for connecting the conducting tube or shank to the disk or disk support; such means comprising an arm or member attached to or formed integral with the body of said conducting tube or shank, extending forwardly therefrom intermediate the receiving end of said tube or shank and the shoe, runner, divider, cutter or hoe-point and intersecting the axis of the disk and disk support has a pivotal connection, whereby the disk or conductor may rise or fall independently of each other.

A further object of the invention is to connect the conducting tube or shank with the disk or disk support, concentric with the axis of the disk by an arm or member extending forwardly from a point approximately midway of the tube or shank and pivotally connecting said arm or member, whereby the disk and arm may rise and fall independently of each other, said arm being disposed preferably on the convex side of the disk; the said conducting tube or shank maintained in vertical working position, with its shoe, runner, divider, cutter or hoe-point following in the cut of the disk, by means of a suitable guide supported by the draw-bar or the support carrying the disk.

That the invention may be more fully understood, reference is had to the accompanying drawings, in which—

Figure 1 is a side elevation of our improved disk-shoe-drill, looking at the landside of the disk; Fig. 2 is a view similar to Fig. 1, showing a modified form of shoe, runner, cutter or divider attached to the conductor or shank; Fig. 3 is a side elevation of our improved disk-shoe-drill, looking at the furrow-side of the disk and showing a modified construction at the delivery end of the tube; Fig. 4 is a view similar to Fig. 1 showing a further modification of the delivery end of the tube which consists in attaching to the tube a hoe-point, and Fig. 5 is an enlarged cross-section in plan as the same would appear on the line 5—5 of Fig. 1.

Like numerals of reference indicate corresponding parts throughout the figures.

In the drawings 1, denotes a draw-bar of which only a portion is shown. Said bar may be of any well known or approved construction and in practice is usually pivoted at its forward end to a frame part of a drill. From the draw-bar at or near its inner end is hung a bracket 2. This bracket is formed with the lower bearing portion 3. Extending from the rear side of the portion 3 of the bracket are a pair of similar bearing rings 4 and 5, 4 designating the outer ring and 5 designating the inner ring. The formation of the ring 4 leaves an annular flange 6. In assembling, the disk 7, which has an opening 8 will be passed over the ring 4, bringing the convex or landside of the disk adjacent the flange 6 of the bearing 3. Before this is done, however, a removable sleeve bearing 9, which is preferably cone shaped and provided with a flange 10, is inserted into the ring 4 and over the ring 5, the bearing 9 being locked against rotation by providing the flange 10 with a slot 11 fitting over a lug 12, see Fig. 5, projecting inwardly from the flange or ring 4. When the disk is passed over the ring 4, a bearing 13, which is riveted, or otherwise suitably secured to the disk, is passed over the sleeve bearing 9 and a portion of said bearing 13 is inserted under the inner end of ring 4 and brought into proximity to the flange 10 of sleeve bearing 9. A disk washer 14 is then inserted into the open end of bearing 13 and against the end of sleeve bearing 9, when a bolt or spindle 15 is inserted through washer 14, sleeve bearing 9 and through an opening 16 in bearing plate 3 projecting far enough through, so that a bearing may be formed for the forward end of an arm or member 17 projecting forwardly from and attached to or forming a part of a conducting tube or shank 18. The outer face of the bearing plate 3 is provided with an annular recess 19, and the opening in the forward end of the arm or member 17 is preferably of the same diameter as said recess. To attach the arm or member 17 so that it may have a pivotal relation with the disk and disk support, the forward end of the arm or member 17 is passed over the end of the bolt or spindle 15, bringing the end of the arm or member adjacent to the bearing plate 3, when a washer 20, having an annular shoulder 21 is passed over the bolt or spindle 15, inserting the shoulder 21 of washer 20 through the opening in the end of the arm or member 17 and seating said annular shoulder 21 in the recess 19 of bearing plate 3. This done, the parts are retained in the relation by a nut 22 screwed on the end of the bolt 15. Over the open end of bearing 13 is placed a dust cap 23.

The foregoing description discloses the preferred form of support for the disk on the draw-bar and the preferred connection for the arm or member 17 of the tube or shank, to the disk or disk support, whereby a pivotal connection is made between the tube or shank and said disk and at a point concentric with the axis of the disk. It is understood, however, that we do not limit ourselves to the exact construction shown and that we are aware that other and various connections could be made for obtaining the results aimed at herein.

The arm or member 17, as described, is attached to or forms a part of a seed conducting tube or shank 18, and is preferably connected with the said tube or shank, approximately midway of its length or between the receiving and delivery ends of said tube. This tube or shank 18 is preferably of the closed delivery type and has a feed conduit 24 extending from the upper to the lower end thereof, and said shank or tube 18 is preferably carried to the rear of the disk and more to the landside of said disk, with the arm 17 extending forwardly and curved outwardly following the contour of the convex face of the disk to a point where it is pivotally connected to the disk or disk support, in the manner previously described.

In Figs. 1 and 2, the boot, conductor or tube is provided with a shoe, runner, cutter or divider 25 extending forwardly from the lower end thereof to a point in proximity to the disk and being unattached at its forward end. In Fig. 3, the runner, shoe, cutter or divider is omitted and the boot extended to a point to travel in the cut made by the disk and is turned rearwardly, as shown at 26, to insure a proper discharge of the grain or seed in the furrow, maintained by the boot itself. In Fig. 4 a hoepoint is substituted for the shoe, runner, cutter or divider shown in Figs. 1 and 2. It is obvious from the disclosures herein, that any type of shoe, runner, cutter or divider may be used on the lower end of the tube or shank.

The disk is preferably mounted or carried diagonally to the line of draft, see Fig. 5, whereas the runner, shoe, cutter, divider or equivalent thereof, is disposed directly in the line of draft, so as to follow in the cut made by the disk and form the furrow and ride on the bottom thereof. In other words, it is the function of such runner, shoe, cutter, divider or equivalent member to cut or divide the earth in coöperation with the disk and spread and hold open the furrow, into which the seed or grain drops through the tube or shank 18. Pivotally connecting the tube or shank to the disk or disk support allows the tube to be independently movable, so that in following the irregularities of the ground, the disk and tube or shank may rise and fall independently of each other and each without disturbing the other.

Extending rearwardly from the rear end of the draw-bar 1, is a bracket-guide 28 which is rigidly secured to said draw-bar, and said bracket is carried across the landside of the tube or shank 18 to a point beyond the same, and is formed with a curved arm 29 passing around the shank in the manner shown. To the rear end of the bracket-guide 28 is attached the lower end of the spring-lift rod 30 which is attached at its opposite end to suitable operating means of the drill. Said bracket-guide 28 has also attached thereto, a coil spring 31, which has its opposite end attached to a hook 32 projecting from the upper end of the shank.

Through the rod 30, the depth of the disk in the ground may be regulated. To lower the rod will depress the draw bar 1 and as the drill is moved forward, the disk will cut its way into the ground producing a furrow in which will follow the shoe, runner, cutter or divider 25. The spring 31, while it has a tendency, when the disk is forced into the ground, to force the shank down into the furrow, that is not its sole object, as it is employed largely to steady the shank in its relation to the disk. On the shank are lugs 33 and 34. When lifting disk and shank the bracket guide and curved arm thereof will engage with the lugs 33. The lug 34 is used to protect the spring 31; for instance, should this runner or shoe and shank be accidentally raised, the lug 34 will engage with the bracket guide, and thereby protect the spring.

Having thus fully described our invention, what we claim and desire to secure by Letters Patent of the United States, is:—

1. In a disk-drill, in combination, a disk and a disk mounting, a seed conductor, an arm extending forwardly from said conductor intermediate its receiving and delivery ends and pivotally connected with the disk mounting concentric with the axis of the disk, a guide for the conductor, said guide being distinct from said arm, and an earth engaging member connected with the lower end of the conductor and unattached at its forward end.

2. In a disk-drill, in combination, a disk and a disk mounting, a seed conductor, an arm attached to the conductor and pivotally attached to the disk mounting concentric with the axis of the disk, so that the conductor may have vertical movement independent of the disk, and a runner connected with the delivery end of the conductor, said runner unattached at its forward end and adapted to travel in the wake of the cutting edge of the disk.

3. In a disk-drill, in combination, a concavo-convex disk and a disk mounting, a seed conductor, an arm attached to the conductor, said arm extending forwardly and conforming to the contour of the convex face of the disk and pivotally attached to the disk mounting concentric with the axis of the disk, a guide for the conductor, attached to the disk mounting, and a runner connected with the delivery end of the conductor, said runner unattached at its forward end and adapted to travel in the wake of the cutting edge of the disk.

4. In a disk-drill, in combination, a disk, a support therefor, a seed conductor, a mounting for the conductor comprising an arm extending at right angles from the conductor and at approximately a central point midway of said conductor and pivotally attached at its forward end to the support of the disk and concentric with the axis of the disk, whereby the conductor may have vertical movement independent of the disk; the earth engaging portion of the conductor being free and unattached; a guide for the conductor, said guide connected with the disk support; means for raising and lowering the guide so as to raise or depress the disk, and means on the conductor adapted to engage with the guide.

In testimony whereof we affix our signatures, in presence of two witnesses.

LUTHER E. ROBY.
CLARENCE A. PATTISON.

Witnesses:
CHAS. W. LA PORTE,
ROBT. N. MCCORMICK.

---

Copies of this patent may be obtained for five cents each, by addressing the "Commissioner of Patents, Washington, D. C."